United States Patent [19]
Blackburn

[11] 3,781,621
[45] Dec. 25, 1973

[54] D.C. MOTOR BRAKING CIRCUIT ESPECIALLY FOR USE WITH VOLTAGE REGULATORS

[75] Inventor: Richard D. Blackburn, Dalton, Mass.

[73] Assignee: General Electric Company

[22] Filed: June 21, 1972

[21] Appl. No.: 264,865

[52] U.S. Cl. .................................... 318/373
[51] Int. Cl. ................................... H02p 3/24
[58] Field of Search........... 318/258, 261, 264, 318/267, 273, 275, 362, 369, 373, 599, 612

[56] References Cited
UNITED STATES PATENTS
3,344,328  9/1967  Morris ......................... 318/373 X
3,596,160  7/1971  Rakes .............................. 318/258

Primary Examiner—Bernard A. Gilheany
Assistant Examiner—W. E. Duncanson, Jr.
Attorney—Francis X. Doyle et al.

[57] ABSTRACT

A D. C. motor braking circuit is disclosed particularly for use with voltage regulators. The circuit utilizes a bilateral transistor which is turned on by the action of the voltage regulator control device to energize a pulse transformer which will apply a D.C. braking current to the motor of the voltage regulator through diodes. To prevent control instability, a pair of transistors are provided which are turned on during the braking period to prevent the control circuit of the voltage regulator from operating.

10 Claims, 2 Drawing Figures

D.C. MOTOR BRAKING CIRCUIT ESPECIALLY FOR USE WITH VOLTAGE REGULATORS

BACKGROUND OF THE INVENTION

This invention relates to a motor braking circuit and more particularly to a D.C. motor braking circuit especially useful in voltage regulators.

As is well known to those skilled in the art, voltage regulators of the motor driven variable transformer type are often required to operate very rapidly and with a very small deviation from the normal output of the regulator. The stability of such regulators is normally dependent on the amount of motor coast which occurs after the voltage regulator control shuts off the motor. If the motor coasts sufficiently to exceed the band width setting of the voltage control, the motor will be continuously energized running the regulator from one edge of the band width to the other. To prevent such operation, various means are provided to brake the motor after the control has ceased. Present day braking devices use mechanical solenoid type brakes which are subject to wear; or relay means to disconnect the motor from the A.C. supply and connect it to a D.C. brake supply. It has long been desired to provide a D.C. braking circuit which would electronically provide the braking current without moving parts and without any mechanical means. It is also desired to provide a simple, inexpensive, reliable means for braking the motor of a voltage regulator. A further desire in the voltage regulator art is the provision of means which will disconnect the voltage control of the regulator during the braking of the motor to prevent the instability of the control circuit.

It is, therefore, a principal object of this invention to provide a novel, electronic D.C. braking circuit particularly useful for braking the motor of a voltage regulator.

A still further object of this invention is to provide a novel D.C. motor braking circuit having provisions for disabling the control of a voltage regulator during the braking period.

A still further object of this invention is to provide a novel D.C. braking circuit for the motor of a voltage regulator which will control the A.C. supply to provide A.C. or D.C. or no voltage to the motor and which utilizes no moving parts in the device.

SUMMARY OF THE INVENTION

Briefly, this invention provides an electronic D.C. motor braking circuit. In a preferred form, the circuit comprises a D.C. pulse generator which is actuated by the control circuit turning off the motor. The pulse generator provides a D.C. pulse to the motor thereby braking it after the voltage control has ceased. Additionally, in the preferred form, a disabled circuit is provided which generates a signal to the voltage control unit to disable such control during the motor braking to eliminate any possibility of control instability.

The invention which is sought to be protected will be particularly pointed out and distinctly claimed in the claims appended hereto. However, it is believed that this invention and the manner in which its various objects and advantages are obtained as well as other objects and advantages thereof will be better understood by reference to the following detailed description of a preferred embodiment, particularly when considered in the light of the accompanying drawings.

DESCRIPTION OF A PREFERRED EMBODIMENT

Figure 1:
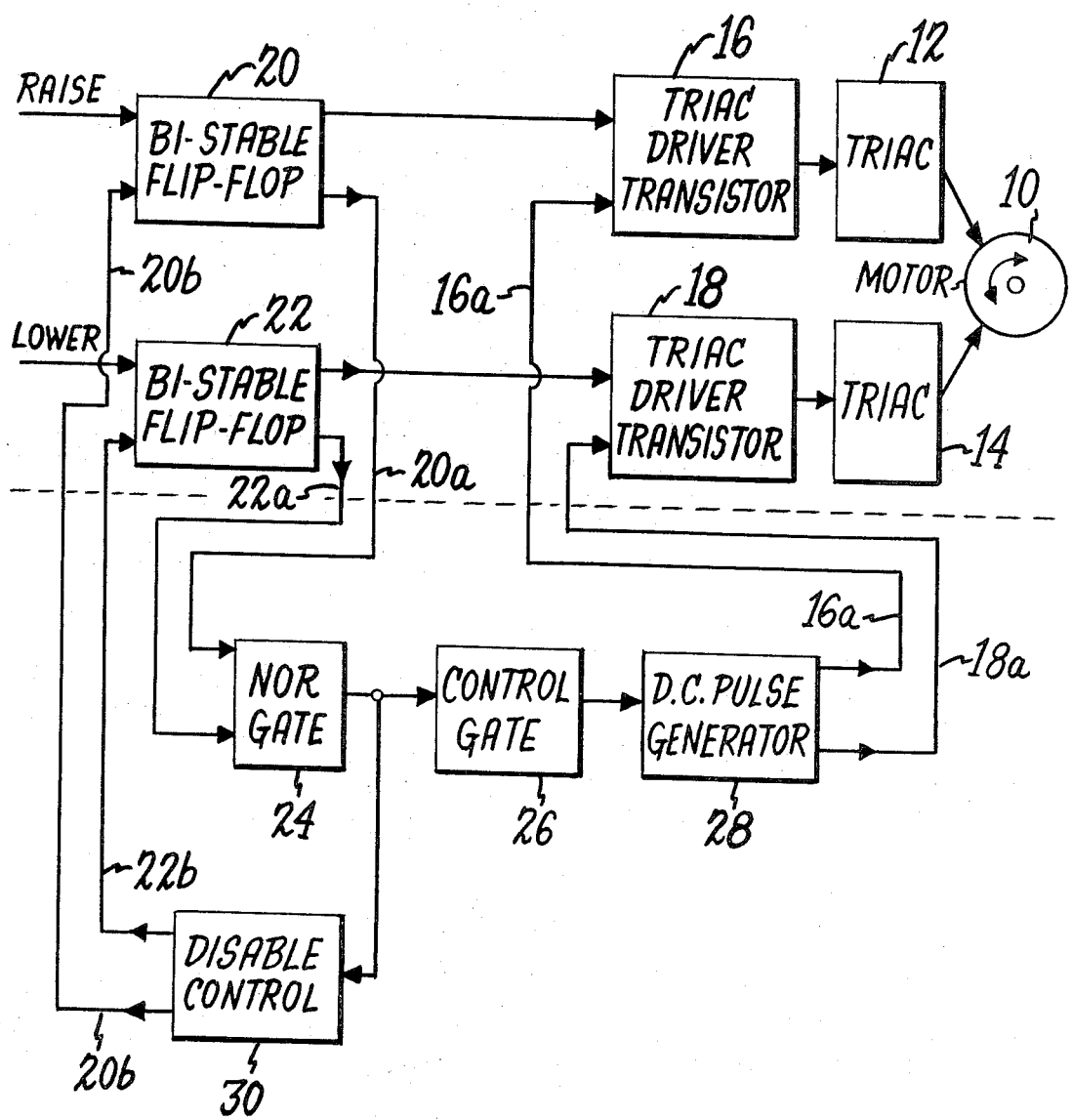
FIG. 1 is a block diagram of a voltage regulator control system showing the preferred form of D.C. motor braking circuit according to this invention.

As above noted, this invention relates to a D.C. motor braking circuit especially useful for braking the motor of a motor driven variable transformer type voltage regulator. FIG. 1 shows a block diagram of the control system of such a voltage regulator with the braking circuit of this invention connected thereto. In FIG. 1 the normal voltage regulator control circuit is shown above the dotted line while the braking circuit of this invention is shown below such dotted line. Referring now to FIG. 1, there is shown a motor 10 which is used to raise or lower the voltage output of a variable transformer type voltage regulator (not otherwise shown). In the type of control circuit shown, the motor 10 is energized to rotate in either direction by means of a solid state semiconductor device indicated as a triac 12 or 14. The triacs 12 or 14 are operated by means of the driver transistors 16 and 18, respectively, which in turn are operated by the bistable flip-flop circuits 20 and 22, respectively. As will be understood, when a raise or lower signal is received at either bistable device 20 or 22, the appropriate driver 16 or 18 will be turned on to thereby activate either the triac 12 or the triac 14 to cause motor 10 to rotate in the proper direction to raise or lower the voltage of the voltage regulator. When the voltage reaches the proper level, the bistable device 20 or 22 will be turned off stopping the signal to motor 10. However, motor 10 will coast for a brief period causing an incorrect voltage unless prevented from coasting by a braking means.

The braking means of this invention is shown in FIG. 1 as comprising a "nor" gate 24 which is operated by a signal from either bistable device 20 or 22 over the lines 20a or 22a, respectively. "Nor" gate 24 actuates a control gate 26 which in turn controls the D.C. pulse generator 28. The pulse generator 28 applies a D.C. pulse to the drivers 16 and 18 over the lines 16a and 18a, respectively, which thereby turn on triacs 12 and 14 to apply D.C. braking to the motor 10, stopping it rapidly and thus preventing overrunning the desired voltage. If desired, and as shown in the preferred embodiment, a disable control means 30 may be provided which is operated by "nor" gate 24 to provide a signal to bistable flip-flop circuits 20 and 22 over lines 20b and 22b, prohibiting their operation while the braking current is applied to motor 10.

Figure 2:
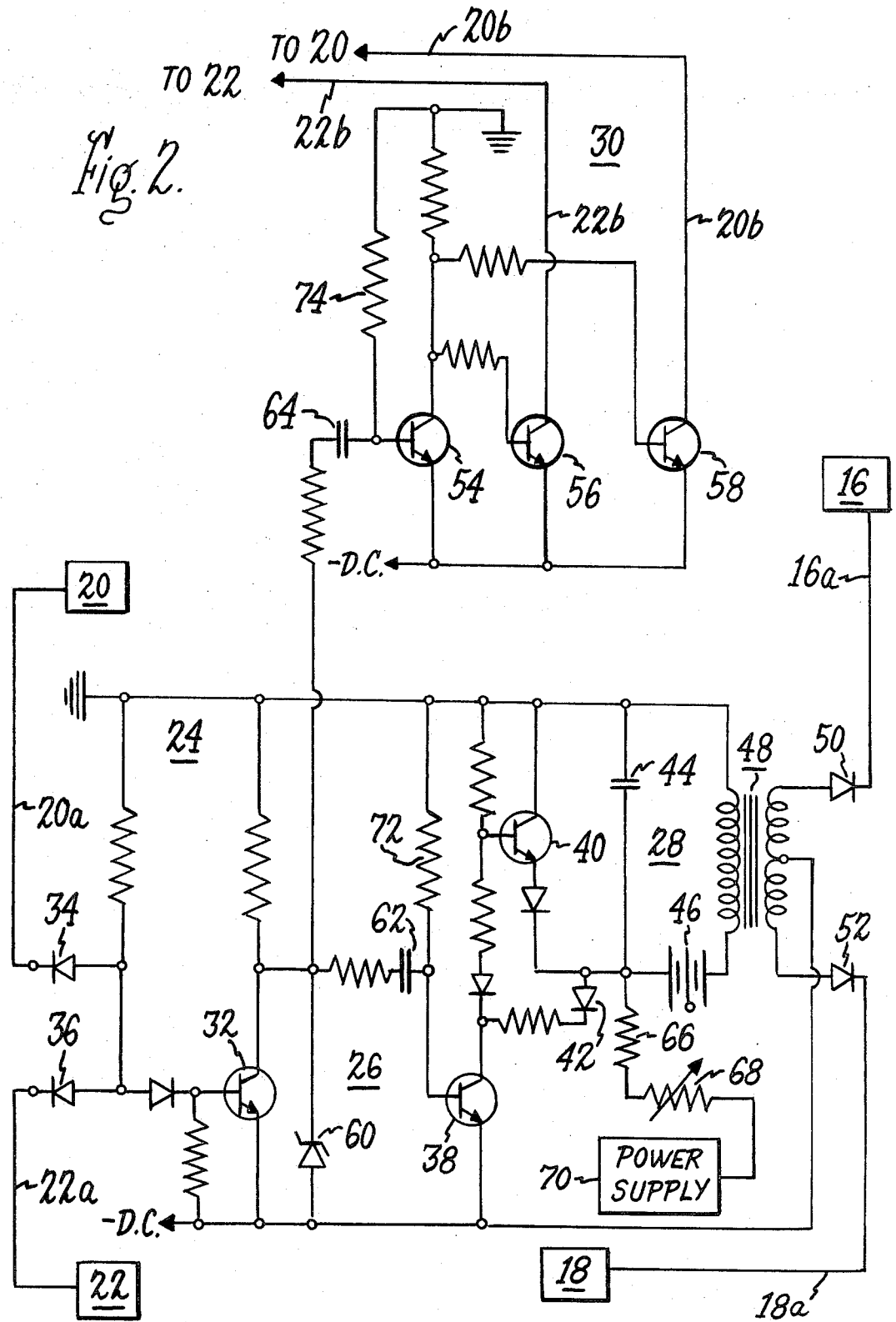
FIG. 2 is a schematic circuit diagram of the preferred form of D.C. motor braking circuit shown in FIG. 1.

A schematic diagram of the preferred embodiment of the braking circuit is shown in FIG. 2. As there shown, the "nor" gate 24 comprises a transistor 32 which is normally conducting and is provided with a turn off signal from the raise or lower flip-flops 20 or 22 over the lines 20a or 22a, respectively, through the diodes 34 or 36. The control gate 26 includes transistors 38 and 40 with transistors 38 and 40 normally conducting. With transistor 38 conducting, transistor 40 is also conducting and diode 42 conducts to prevent any charge being built up on the capacitor 44 which is a part of the pulse generator 28. The remainder of pulse generator 28 includes a bilateral transistor 46 and a transformer 48. As is apparent from FIG. 2, pulses from transformer 48 will be coupled through diodes 50 and 52 over lines 16a and 18a, respectively, to the triac drivers 16 and 18. The control disable circuit 30 which is shown in the preferred embodiment includes a transistor 54 which is normally conducting and transistors 56 and 58 which are normally nonconducting. When 56 and 58 conduct, they provide a signal over the lines 20b, 22b, to the bistable devices 20 and 22 to prevent their operation.

From the above description, it is believed apparent the manner in which the braking circuit and disabling circuit of this invention operate. However, it will be briefly reviewed to assure a clear understanding of its operation.

Under normal conditions, when the voltage regulator is at rest no raise or lower control signals are generated to the bistable flip-flop devices 20 or 22. Under this condition, diodes 34 and 36 are nonconducting and transistor 32 is conducting. Transistor 38 is also conducting thereby preventing any charge from being built up on the capacitor 44. Also, in the disable circuit 30, transistor 54 is conducting while transistors 56 and 58 are in the non-conducting state. When a raise or lower signal is given by the voltage regulator, either bistable device 20 or 22 will become conducting. Conduction of either bistable device 20 or 22 will cause either diode 34 or 36 to conduct thereby turning off transistor 32. A Zener diode 60 is provided, as shown in FIG. 2, to stabilize the collector voltage of the transistor 32. Capacitors 62 and 64 will charge to the voltage of Zener diode 60 but will not affect the conducting state of transistors 38 and 54. When the control signal is removed from the bistable device 20 or 22, diode 34 or 36 will stop conducting allowing transistor 32 to return to the conducting state. At this time, the coupled charge of capacitor 62 will then reverse bias transistor 38 turning it off. Transistor 40 and diode 42 will also be turned off allowing capacitor 44 to charge. The time constant of capacitor 44 and resistors 66 and 68 and the breakdown voltage of bilateral transistor 46 are selected such that transistor 46 will turn on at close to the peak of the 60 cycle waveform from the power supply 70. Since transistor 46 is bilateral, the circuit action will be the same on both positive and negative halves of the incoming 60 cycle waveform from the power supply 70. Pulses from the transformer 48 are coupled to the diodes 50 and 52 over lines 16a and 18a to the triac drivers 16 and 18. These pulses turn on triacs 12 and 14 in a sequence to generate D.C. braking of motor 10, stopping the motor. Capacitor 62 will then discharge through resistor 72. This will allow transistor 38 to again become conducting, shunting capacitor 44 and removing the D.C. brake.

While the above sequence occurs, the disable control is also activated. The coupled charge through capacitor 64 will turn off transistor 54 in the same manner that the coupled charge of capacitor 62 turns off transistor 38. This will allow transistors 56 and 58 to turn on and thereby provide a signal to bistable devices 20 and 22 over the lines 20b and 22b preventing the operation of bistable devices 20 and 22. Capacitor 64 will then discharge through resistor 74 allowing the transistor 54 to again become conducting and turning off transistors 56 and 58. It will be appreciated that the time constant of capacitor 64 and resistor 74 is such, compared to capacitor 62 and resistor 72, that the D.C. braking is removed before the disable control signal is removed. At the end of this sequence, the control is in normal condition ready to receive another raise or lower signal.

From the above description, it will be apparent that this invention provides a novel D.C. braking circuit for the motor of a voltage regulator. It will also be apparent that the braking circuit of this invention may be used to provide D.C. braking for any desired motor. Those skilled in the art will also understand that the braking circuit may be used without the control disable circuit, if desired.

While there has been shown and described the present preferred embodiment of this invention, it will be obvious to those skilled in the art that various modifications may be made without departing from the spirit and scope of the invention as it is defined in the appended claims.

What is claimed as new and which it is desired to secure by Letters Patent of the United States is:

1. A braking circuit for applying D.C. pulses to a motor for braking such motor wherein such motor is provided with a signal forming a control circuit for operating such motor; said braking circuit comprising a solid state semi-conducting gate, said solid state gate being actuated by the removal of the signal from the motor control circuit, a solid state control device, said solid state control device being turned on by a signal from said gate, a pulse generator, said pulse generator being actuated by said control device to generate D.C. pulses, and means applying said D.C. pulses to the motor for braking such motor.

2. A braking circuit for applying D.C. pulses to a motor for braking such motor as set forth in claim 1 in which a control disable circuit comprising transistors is provided, said control disable circuit being actuated by said solid state device to provide signals for preventing operation of the control circuit of the motor.

3. A D.C. motor braking circuit for a voltage regulator wherein the voltage regulator is provided with a voltage control circuit and a motor actuated by said control circuit to raise or lower the voltage of the regulator, said braking circuit comprising a semiconducting gate which is connected to said voltage control circuit, said gate being actuated by either a raise or lower signal from said control circuit, a control mechanism, said control mechanism being connected to said gate, said control mechanism including semiconducting devices which are actuated by said gate, and a D.C. pulse generator, said D.C. pulse generator being connected to said control device, said actuation of said control device energizing said D.C. pulse generator to generate pulses which are connected through lines to the motor of the voltage regulator for application of D.C. braking to such motor.

4. A D.C. motor braking circuit as set forth in claim 3 in which said D.C. pulse generator comprises a capacitor which is charged after the control signal of said voltage regulator ceases, said charge capacitor turning on a bilateral semiconducting device which is connected to a transformer for providing pulses to the transformer, the pulses of said transformer being coupled through diodes to the motor of the voltage regulator.

5. A D.C. motor braking circuit as set forth in claim 3 in which a disable control is provided, said disable control being actuated by said semiconducting gate to turn on a pair of transistors which provide disable signals to said voltage control circuit of the voltage regulator control.

6. A D.C. motor braking circuit for a voltage regulator wherein the voltage regulator is provided with a voltage control circuit and a motor actuated by said control circuit to raise or lower the voltage of the regulator, said braking circuit comprising a transistor gate which is connected to said voltage control circuit, said transistor gate being normally conducting and turned off by a signal from said voltage control circuit, a control mechanism, said control mechanism being connected to said gate, said control mechanism including normally conducting transistor devices which are turned off when said transistor gate becomes conducting by removal of said signal from said voltage control circuit, and a D.C. pulse generator, said D.C. pulse generator being connected to said control device, turning off of said control mechanism energizing said D.C. pulse generator to generate pulses which are connected through lines to the motor of the voltage regulator for application of D.C. braking to such motor.

7. A D.C. motor braking circuit as set forth in claim 6 in which a disable control is provided, said disable control being actuated by said transistor gate to turn on a pair of transistors which provide disable signals to said voltage regulator control circuit.

8. A D.C. motor braking circuit as set forth in claim 6 in which said D.C. pulse generator comprises a capacitor which is charged after the control signal of said voltage regulator ceases, said charge capacitor turning on a bilateral semiconducting device which is connected to a transformer for providing pulses to the transformer, the pulses of said transformer being coupled through diodes to the motor of the voltage regulator.

9. A D.C. motor braking circuit as set forth in claim 8 in which a disable control is provided, said disable control including a normally conducting first transistor which is turned off when said transistor gate becomes conducting, and a pair of normally nonconducting transistors which are turned on when said first transistor is turned off, providing disable signals to said voltage control circuit.

10. A D.C. motor braking circuit for a motor, said braking circuit comprising a semiconducting gate which is connected to a control signal for the motor, said gate being normally conducting and turned off by the control signal, a control mechanism, said control mechanism being connected to said gate, said control mechanism including semiconducting devices, said control mechanism actuated by said gate when said gate again becomes conducting by removal of the control signal, and a D.C. pulse generator, said D.C. pulse generator being connected to said control device, said actuation of said control device energizing said D.C. pulse generator to generate pulses which are connected through the lines to the motor for application of D.C. braking to such motor.

* * * * *